US005672674A

United States Patent [19]
Walz et al.

[11] Patent Number: 5,672,674
[45] Date of Patent: Sep. 30, 1997

[54] ANTI-STAIN FINISHING OF POLYAMIDE-CONTAINING FIBRE MATERIALS, COMPOSITIONS THEREFOR AND POLYAMIDE-CONTAINING FIBRE MATERIALS THUS FINISHED

[75] Inventors: Klaus Walz, Leverkusen; Udo Winfried Hendricks, Odenthal; Hans-Albert Ehlert, Leverkusen, all of Germany

[73] Assignee: Bayer Aktiengesellschaft, Leverkusen, Germany

[21] Appl. No.: 372,089

[22] Filed: Jan. 13, 1995

[30] Foreign Application Priority Data

Jan. 19, 1994 [DE] Germany .................. 44 01 390.6

[51] Int. Cl.⁶ .................. C08G 8/04; C08G 14/02
[52] U.S. Cl. .................. 528/129; 528/143; 528/148; 528/150; 528/162; 524/556; 428/96; 428/267; 427/393.4; 252/8.6; 252/8.75; 8/115.54; 8/115.56; 8/115.6; 8/116.4
[58] Field of Search .................. 528/129, 143, 528/148, 150, 162; 427/393.4; 524/556; 8/115.54, 115.56, 115.6, 116.4; 252/8.6, 8.75; 428/96, 267

[56] References Cited

U.S. PATENT DOCUMENTS

| | | | |
|---|---|---|---|
| 4,822,373 | 4/1989 | Olson et al. | 8/115.6 |
| 4,937,123 | 6/1990 | Chang et al. | 524/556 |
| 4,940,757 | 7/1990 | Moss, III et al. | 525/401 |
| 5,061,763 | 10/1991 | Moss, III et al. | 525/401 |
| 5,073,442 | 12/1991 | Knowlton et al. | 427/389 |
| 5,074,883 | 12/1991 | Wang | 8/115.6 |
| 5,223,340 | 6/1993 | Moss, III et al. | 8/115.6 |
| 5,310,828 | 5/1994 | Williams | 525/502 |
| 5,310,855 | 5/1994 | Walz et al. | 528/137 |
| 5,464,911 | 11/1995 | Williams et al. | 525/508 |

FOREIGN PATENT DOCUMENTS

| | | |
|---|---|---|
| 0235980 | 9/1987 | European Pat. Off. . |
| 0322995 | 7/1989 | European Pat. Off. . |
| 0332343 | 9/1989 | European Pat. Off. . |
| 0433017 | 6/1991 | European Pat. Off. . |
| 4138382 | 5/1993 | Germany . |
| 9012917 | 11/1990 | WIPO . |
| 9102116 | 2/1991 | WIPO . |
| 9119849 | 12/1991 | WIPO . |
| 9309156 | 5/1993 | WIPO . |

*Primary Examiner*—Samuel A. Acquah
*Assistant Examiner*—P. Hampton-Hightower
*Attorney, Agent, or Firm*—Sprung Horn Kramer & Woods

[57] ABSTRACT

Polyamide-containing fibre materials can be given an anti-stain finish by treating them with a sulpho-containing aromatic formaldehyde condensation product in combination with polyacrylic acid, the treatment with the two components being carried out in any desired order or simultaneously.

17 Claims, No Drawings

ANTI-STAIN FINISHING OF POLYAMIDE-CONTAINING FIBRE MATERIALS, COMPOSITIONS THEREFOR AND POLYAMIDE-CONTAINING FIBRE MATERIALS THUS FINISHED

BACKGROUND OF THE INVENTION

The present invention relates to a process for the anti-stain finishing of polyamide-containing fibre materials by treating these fibre materials with a sulpho-containing aromatic formaldehyde condensation product in combination with polyacrylic acid. The invention also relates to compositions for carrying out the process of the invention, which consist of a combination of such a formaldehyde condensation product and polyacrylic acid. The invention further relates to polyamide-containing fibre materials thus treated.

Practical experience with the use of fibre materials, especially those made of synthetic polymers, has shown that acid dyes as present in food or beverages will stain them to such an extent that removal of these stains is virtually impossible. This is especially true of polyamide-containing fibre materials.

Various stain-resist finishes which, following application facilitate the removability of acid dye stains from synthetic fibre materials, have been proposed. EP 235 980 proposes modified polymeric sulphonated phenolformaldehyde condensates in which 10–25% of all cocondensed phenol units contain $SO_3^-$ radicals and 90–75% of the phenol units contain sulphone groups. U.S. Pat. No. 4,822,373 describes a finishing process using aqueous liquors which partly contain sulphonated novolak resins and polymers of methacrylic acid. U.S. Pat. No. 4,937,123 describes a finishing process for such fibre materials where polymers of methacrylic acid are used alone.

All prior art processes have disadvantages. Either good anti-stain effects are obtained, but the light fastness of the finish is poor, or good light fastness is obtained but the anti-stain effects are only moderate or even minimal.

SUMMARY OF THE INVENTION

There has now been found a new way of finishing polyamide-containing fibre materials which combines both advantages and so avoids the disadvantages described. Surprisingly, the advantageous effect is obtained in particular through the use of polyacrylic acid. This is all the more surprising as comparative example C 2 of U.S. Pat. No. '123 shows that a pure acrylic acid polymer has a remarkably poor anti-stain effect.

A process has been found for the anti-stain finishing of polyamide-containing fibre materials which is characterized in that such fibre materials are treated with a sulpho-containing aromatic formaldehyde condensation product in combination with polyacrylic acid, the treatment with the formaldehyde condensation product and the polyacrylic acid being carried out in any desired order or simultaneously.

DETAILED DESCRIPTION OF THE INVENTION

The novel process for the anti-stain finishing of polyamide-containing fibre materials can be carried out by applying the formaldehyde condensation product thereto before the polyacrylic acid. However, it is similarly possible to reverse this order and to apply the polyacrylic acid first and only then the formaldehyde condensation product. Preferably, the two components are applied simultaneously using a ready-prepared mixture. This last preferred variant has the advantage that the manufacturer of such finishing materials makes available to the user a ready-prepared mixture which facilitates the practice of the process according to the invention.

The invention therefore also provides compositions for carrying out the process of the invention in its preferred variant of the simultaneous application of the two components; such compositions consist of a ready-prepared mixture of the formaldehyde condensation product and the polyacrylic acid.

Finally, the invention further provides polyamide-containing fibre materials and products produced therefrom, which have been finished by the above-described process of the invention. Such fibre materials and products can be dyed or undyed.

Thus finished polyamide-containing fibre materials and products can be used in the various sectors of their total known use spectrum, for instance as carpet material, as furniture and upholstery cover materials, as apparel materials, as materials in the technical sector, etc. Preferably, the finish according to the invention will be important for the sector of carpet materials. The invention therefore preferably relates to fibre materials which have been finished according to the invention for the production of carpet material and to carpet material thus produced.

Since the above-described stains which are readily removable following treatment according to the invention also arise in an undesirable manner when a fibre material consists of polyamide only to a minor extent, i.e. fibre blends, the invention concerns fibre materials which have been finished according to the invention and have a polyamide content of 20–100% by weight of the total fibre material.

Usable according to the invention are condensation products which are obtained from aromatic compounds and formaldehyde and contain sulphonic acid groups. They are water-soluble and compatible with polyacrylic acid.

Suitable condensation-capable aromatic compounds include benzene and naphthalene derivatives which are monosubstituted to trisubstituted by hydroxyl, $C_1$–$C_4$-alkyl, cyclopentyl, cyclohexyl, $C_1$–$C_4$-alkoxy, $C_1$–$C_4$-hydroxyalkoxy, phenyl, phenoxy, benzyl, benzyloxy, carboxyl, $C_1$–$C_4$-alkoxycarbonyl, phenylcarbonyl, carboxymethoxy, phenylsulphonyl or a plurality thereof, which can be identical or different. In many cases, a plurality of these compounds are subjected to condensation together. In each case, 10–100% of all benzene or naphthalene derivatives carry sulphonic acid groups.

Suitable benzene or naphthalene derivatives include for example xylene, mesitylene, phenol, cresols, xylenols, butylphenol, cyclohexylphenol, anisole, phenoxyethanol, phenoxypropanol, phenolsulphonic acid, salicylic acid, 4-hydroxybenzoic acid, anisolesulphonic acid, diphenyl ether, ditolyl ether, dihydroxydiphenyl sulphone, 2,2-bis(4-hydroxyphenyl)propane, 4-hydroxydiphenyl sulphone, bis(hydroxyethoxyphenyl) sulphone, salicylic acid, 4-hydroxybenzoic acid, naphthalene, naphthols, isobutylnaphthalene, naphtholsulphonic acid, naphthyl methyl ether, biphenylsulphonic acid, sulphonated dihydroxydiphenyl sulphone, oxydiphenylsulphonic acid.

The condensation is carried out in the manner known from phenolic resin chemistry by means of acids or alkalis, preferably alkalis, in an aqueous medium. The resulting condensates are mixtures of various species having average molecular weights within the range of 200–2000. They are characterized by stating the molar ratios of cocondensed aromatic compounds to the formaldehyde; it is aromatics to $CH_2O=1–2:1$.

The introduction of the sulphonic acid groups can be carried out in a conventional manner before, during or after the condensation with formaldehyde, for example by reaction with $SO_3$, sulphuric acid, oleum, chlorosulphonic acid or by reaction with formaldehyde/sulphite or bisulphite. The condensation of the aromatic compounds with formaldehyde is alkali- or acid-catalyzed; if this is done using sulphuric acid as catalyst, the sulphonic acid group can be introduced during the condensation. Preferably, however, the aromatic compounds used for the condensation already carry the sulphonic acid group. This makes it possible to use the preferred alkali-catalyzed condensation. Sulphonic acid groups can also be introduced via the formaldehyde-sulphite addition product.

To obtain percentage contents of sulphonic acid groups which differ from 100%, a plurality of aromatic compounds are condensed with formaldehyde simultaneously; they carry sulphonic acid groups only proportionately.

Preferred condensation products are those which are soluble in water at pH 2–5. These are in particular condensation products of dihydroxydiphenyl sulphone with formaldehyde and phenolsulphonic acid, naphthalenesulphonic acid, naphtholsulphonic acid or alkali or alkaline earth metal sulphites or of sulphonyldihydroxydiphenyl-monosulphonic or -disulphonic acid with formaldehyde. In place of sulphites it is also possible to use bisulphites. Cations in the alkali or alkaline earth metal sulphites or bisulphites are lithium, sodium, potassium, magnesium or calcium, preferably sodium or potassium. Preferably, in these condensates, 35–65% of all benzene/naphthalene derivatives carry sulphonic acid group and 65–35% of all derivatives carry sulphone groups.

Of particularly preferred suitability for the process and compositions according to the invention, are condensates of (a) phenolsulphonic acid, (b) dihydroxydiphenyl sulphone and (c). $CH_2O$ in a molar ratio of $a:b:c=1:0.7-2.5:0.85-3.5$.

Suitable polyacrylic acids are homopolymers of acrylic acid or copolymers which contain at least 70 mol % of acrylic acid and not more than 30 mol % of comonomers. Suitable comonomers include maleic acid, vinyl acetate, acrylamide, $C_1$–$C_4$-alkyl acrylates, styrene or $C_2$–$C_6$-olefins. According to the invention, these acrylic acid (co) polymers can be present in their acid form or in the form of their alkali metal or ammonium salts. Preference is given to using polymers which contain more than 90 mol % of acrylic acid units. Particular preference is given to acrylic acid homopolymers. The molecular weights can vary within the range of 1000–500,000, preferably 4000–100,000.

The person skilled in the art knows that, as with the formaldehyde condensation products, the polyacrylic acids too are, owing to their method of preparation, mixtures of species having different molecular weights, of which in each case the average molecular weight is reported for characterization. It is of course possible to use separating methods known to the person skilled in the art to prepare from such mixtures fractions having a narrower molecular weight distribution or, at the extreme, even individual species. According to the invention, however, such separations are not required, so that the labour and costs required for these separations can be saved.

The proportions of condensate and of polyacrylic acid used according to the invention can vary within wide limits, but generally the polyacrylic acids are used in excess or at least in the same weight ratio compared with the condensates. Typical weight ratios are condensates: polyacrylic acids=1:1–20, preferably 1:1–10, particularly preferably 1:2–6.

The process of the invention uses the condensates and polyacrylic acids in solution by treating the polyamide-containing fibre materials separately with solutions of the condensates and polyacrylic acids in any desired order, but preferably simultaneously with a common solution of condensates and polyacrylic acids.

The solvents used are not essential to the invention. Thus, in principle, as well as water it is also possible to use other organic solvents which dissolve condensates and polyacrylic acids. Such organic solvents are known to the person skilled in the art and can be selected by simple preliminary experiments. For ecological reasons and for reasons of safe handling (most organic solvents are flammable!), however, the use of predominantly or purely aqueous solutions is preferred. These solutions contain 3–60% by weight, preferably 10–50% by weight, of condensates and polyacrylic acids (total weight of both together). They may additionally contain small amounts (in each case 0–4% by weight, preferably in each case 0–2% by weight) of additives which are known to the person skilled in the art of textile finishes, for example surfactants (anionic, nonionic or amphoteric surfactants), reducing agents, complexing agents or viscosity control agents; it is frequently customary to use a plurality thereof.

Aqueous compositions for the finishing according to the invention contain for example in the preferred form of the simultaneous use of the condensates and polyacrylic acids 1–15% by weight of condensates, 2–45% by weight of polyacrylic acid, 0–2% of a reducing agent, and 0–2% by weight of a complexing agent (the remainder being water).

Preferred aqueous compositions for use according to the invention contain:

2–10% by weight of a condensation product, which is soluble within the pH range of 2–5, of dihydroxydiphenyl sulphone with formaldehyde and phenolsulphonic acid, naphthalenesulphonic acid or alkali metal sulphites, 8–40% by weight of an acrylic acid polymer having an acrylic acid content of at least 90 mol %, 0–1.5% by weight of a complexing agent selected from the group consisting of nitrilotriacetic acid, ethylenediaminetetraacetic acid, hydroxyethanediphosphonic acid and aminomethylenephosphonic acids, and 0–1.5% by weight of a reducing agent selected from the group consisting of alkali metal or ammonium hydroxymethanesulphinates or dithionites and thiourea dioxide.

In the compositions of the invention, the condensates and polyacrylic acids have the abovementioned weight ratio. The compositions of the invention further contain the likewise abovementioned additives familiar to the person skilled in the art of textile finishing. The compositions of the invention can consequently take the form of the above-described solutions. However, it is additionally possible, for the purposes of despatch and for stockholding, to prepare more concentrated batches of these compositions; it is finally also possible to prepare, and sell, completely solvent- or water-free mixtures of the type described. To carry out the process of the invention, such concentrated forms of the compositions according to the invention are diluted back to concentrations suitable for use.

The anti-stain finish of the invention concerns polyamide-containing fibre materials. Polyamide-containing fibre materials are those consisting of wool, silk or synthetic polyamides of various compositions and their blends with polyester or cotton fibres. In blends, the proportion of the polyamide-containing fibre materials is 50–100% by weight of the total fibre material. Fibres or blends of this kind can be present for application of the finish in the form of the fibres themselves, but also in the form of webs, knitted fabrics, woven fabrics or combination forms, such as carpet material. The process of the invention is particularly important for the treatment of carpet material.

The process of the invention has universal utility as regards the use of various machines or its turn within further processes (e.g. dyeing processes). For instance, it can be carried out as an exhaust process, as a padding process, by spraying, etc.; it is also possible as an aftertreatment of the otherwise already ready-to-use article made of polyamide-containing fibre materials.

The process of the invention is carried out with the following temperatures, liquor ratios, pH values and additions:

In the exhaust process (chiefly for yarns and textile fabrics): liquor ratio 5:1 to 40:1; temperature 50°–100° C., pH 2–7; time 10–30 min; amount used on weight of fibre 0.2–2% by weight, preferably 0.4–1.0% by weight.

In the padding process:
1. Pad-steaming: wet pick-up 80–300%; liquor temperature 10°–90° C.; pH 2–7, preferably 2.5–5; amount used on weight of fibre 0.2–2% by weight, preferably 0.4–1.0% by weight; steaming conditions: saturated steam at 98°–105° C. for 3–20 min.
2. Pad-thermofix process: wet pick-up 65–130%; liquor temperature 10°–90° C.; pH 2–7, preferably 2.5–5; amount used on weight of fibre 0.2–2% by weight, preferably 0.4–1.0% by weight; fixing conditions: 130°–150° C. for 1–5 min.
3. Aftertreatment (by spraying): amount used: 2–40 g of solids per m$^2$ of carpet material, depending on pile weight within the range of 400–2000 g/m$^2$; pH 3–7, preferably 4–6; drying at room temperature possible.

To test the successful finish for the purposes of the present invention, the following procedure is carried out:

A sugar-sweetened refreshment beverage coloured with a red dye is poured into a 68 cm diameter ring placed on the carpet surface, pressed into the carpet and left at room temperature (20°–25° C.) for 8 h. This is followed by rinsing out with cold running water, drying and rating against a scale on which i denotes the poorest value (severe residual staining) and 5 the best value (complete stain removal), as per DE-A-41 38 382).

The process of the invention and the compositions used for carrying it out have the following advantages:

While having the same application properties, they are found to give significantly reduced hue shifts, reduced yellowing under the action of light and improved nitrogen oxide fastness compared with known stain blockers. Compared with the compositions known from EP 235 980 and U.S. Pat. No. 4,822,373, the compositions of the invention show improved shampoo fastness. Compared with the compositions known from U.S. Pat. No. 4,937,123, the compositions of the invention likewise show improved shampoo fastness and additionally an improved anti-stain effect.

EXAMPLES

Example A1

423 parts of dihydroxydiphenyl sulphone were mixed with 162 parts of phenolsulphonic acid (65% strength aqueous solution) and 558 parts of water at 80° C. and then admixed with 151 parts of sodium hydroxide solution (45% strength). Then 136 parts of formaldehyde (30% strength) were added, and the batch was stirred in the sealed autoclave at 115°–120° C. for 8 hours. After cooling down, the autoclave was decompressioned and was found to contain about 1200 parts of the condensation product as a 45% strength solution.

Example A2

24 parts of sulphuric acid (96% strength) were admixed at room temperature with 21 parts of naphthalene by vigorous stirring. This was followed by stirring at 135° C. for hours in a sealed reaction vessel. Thereafter the batch was cooled down to 70°–80° C. and admixed at that temperature with 4 parts of water. Then 33 parts of dihydroxydiphenyl sulphone were added, followed by 15 parts of formaldehyde (37% strength), and the batch was stirred at 105° C. for 6 hours. After cooling down to 70° C., 36 parts of water and 15 parts of concentrated aqueous ammonia were added, and the batch was then adjusted to pH 3–4 with formic acid. Then about 50 parts of water were stirred in, giving about 190 parts of the condensation product as an approximately 40% strength solution.

Example A3

Example A1 was repeated with 227 parts of dihydroxydiphenyl sulphone being reacted with 162 parts of phenolsulphonic acid (65% strength) and 136 parts of formaldehyde (30% strength) in the presence of 360 parts of water and 150 parts of sodium hydroxide solution (45% strength), affording about 1030 parts of the condensation product as an approximately 40% strength solution.

Example A4

In an autoclave, 125 parts of dihydroxydiphenyl sulphone were dissolved in 52 parts of sodium hydroxide solution (45% strength) and 260 parts of water at 80° C. Then 18.5 parts of sodium sulphite and 59 parts of formaldehyde (30% strength) were added and the batch was stirred in a sealed autoclave at 130° C. for 8 hours. After cooling, about 500 parts of the condensation product were obtained as an approximately 34% strength solution.

Example A5

In an autoclave, 112 parts of dihydroxydiphenyl sulphone, 70 parts of phenolsulphonic acid (65% strength) and 93 parts of sodium hydroxide solution (45% strength) were dissolved at 80° C. and then admixed with 56 parts of formaldehyde (30% strength). After the autoclave was sealed, the batch was stirred at 110°–115° C. for 5 hours. The condensation product was obtained as an approximately 38% strength clear solution.

Example A6

54 parts of anisole were stirred at 95°–100° C. for one hour with concentrated sulphuric acid under nitrogen. The pressure was then reduced to 15 mbar and the batch was stirred at 95°–100° C. for a further hour. The reaction mixture was cooled down to 40° C. and dissolved with 50 parts of water. Then 100 parts of 4,4'-dihydroxydiphenyl sulphone and 65 parts of 30% strength formalin solution were added. The mixture was heated to 100°–115° C. and held at that temperature for 4 hours. The semi-solid mixture was dissolved with 375 parts of water and 112 parts of 45% strength sodium hydroxide solution at 70°–80° C., giving 785 parts of a brown, clear solution having a solids content of 30%.

Example A7

59 parts of diphenyl ether were slowly mixed with 41 parts of concentrated sulphuric acid and then heated at 130°–135° C. for 4 hours. After cooling down to 40°–50° C., 75 parts of water, 62.5 parts of 4,4'-dihydroxydiphenyl sulphone and 49 parts of 30% strength aqueous formaldehyde solution were added, and the mixture was stirred at 100°–105° C. for 6 hours. Then the viscous clear solution was diluted with 100 parts of water and neutralized with 91 parts of 25% strength aqueous sodium hydroxide solution. The product obtained was 478 parts of a clear, yellowish solution having a solids content of 38%.

Example A8

55.5 parts of 4,4'-dihydroxydiphenyl sulphone were heated with 40 parts of concentrated sulphuric acid at 115°–120° C. at a pressure of 15 mbar for 5 hours. Then 27 parts of water, 22 parts of 4,4'-dihydroxydiphenyl sulphone and 17.6 parts of 30% strength aqueous formaldehyde solution were added. The mixture was then stirred at 100°–105° C. for 5 hours, diluted with 50 parts of water and neutralized with 130 parts of 25% strength aqueous sodium hydroxide solution. The product obtained comprised 342 parts of a solution having a solids content of 41% and a viscosity of 40.4 mPas at 20° C.

Examples of Polyacrylic Acids Used Commercial Products)

B1 45% strength solution of the sodium salt of a polyacrylic acid (molecular weight 1000–1500)
B2 35% strength solution of a polyacrylic acid (molecular weight about 200,000)
B3 35% strength solution of a polyacrylic acid (molecular weight 90,000–100,000)
B4 50% strength solution of a copolymer of acrylic acid with maleic acid in a weight ratio of 80:20 (molecular weight 30,000)
B5 30% strength solution of the sodium salt of a polyacrylic acid (molecular weight 30,000)

Example C1

118 parts of the product described in Example A3 were mixed with 454 parts of a polyacrylic acid as per Example B2 and 425 parts of water and the mixture was stirred at room temperature to form a pale brown solution of the product of about 20% strength.

Example C2

60 parts of the product as per Example A2 were admixed with 0.7 part of hydroxyethanedisulphonic acid and 0.7 part of sodium hydroxymethanesulphinate, heated at 60° C. for 0.5 hours and, after cooling down, stirred with 285 parts of a polyacrylic acid as per Example B3 and 68 parts of water. An almost colourless 30% strength solution of the product was obtained.

Example C3

103 parts of the product described in Example A5 were admixed with 0.5 part of aminoethanephosphonic acid and 1.0 part of sodium dithionite, heated at 90° C. for 10 minutes and, after cooling down to room temperature, admixed with 325 parts of a polyacrylic acid as per Example B5 and 330 parts of water. 760 parts of an approximately 20% strength solution of the product were obtained.

Example C4

104 parts of the product described in Example A3 were admixed with 0.7 part of ammonium hydroxymethanesulphinate and 0.25 part of hydroxyethanediphosphonic acid, heated at 50°–60° C. for 0.5 hours and, after cooling down to room temperature, admixed with 230 parts of a polyacrylic acid as per Example B3 and 146 parts of water. 480 parts of an almost colourless, about 25% strength solution were obtained.

Example C5

100 parts of the product described in Example A6 were mixed with 260 parts of a sodium polyacrylate as per Example B1 and 140 parts of water at room temperature. A clear pale brown solution having a solids content of about 30% was obtained.

Example C6

60 parts of the product described in Example A8 were admixed with 0.9 part of hydroxyethanediphosphonic acid and 1.0 part of sodium hydroxymethanesulphinate and heated at 50°–60° C. for 0.5 hours. After cooling down to 25° C., the product was admixed with 215 parts of water and 205 parts of a polyacrylic acid as per Example B3 and the mixture was stirred until a homogeneous, slightly yellow solution having a solids content of about 20% was obtained.

Example D1

Carpet material consisting of PP base fabric with a tufted pile of PA 6,6 fibres in a pile weight of 600 g, dyed with a combination of
0.015% of TELON Lightfast Yellow K-RLN 200%
0.0035% of TELON Lightfast Red FRL 200%
0.0033% of TELON Lightfast Blue K-GGL 200%,
was impregnated with a liquor containing 32 g/l of product as per Example C1. The pH of the liquor was adjusted with citric acid to 3. The carpet was then squeezed off to a wet pick-up of 100%. The subsequent steaming was carried out in saturated steam at 102° C. for 15 min. This was followed by rinsing and drying.
Evaluation:
Staining value: 5 on grey scale
Staining value after an aqueous-alkaline extraction: 3
Hue change due to finish was determined colorimetrically and calculated by CIELAB as ΔE: 0.8
The yellowing following the Fade-O-Meter exposure of AATCC-16 for 24 h was evaluated on the grey scale to assess the change in hue. Values 1–5, where 5 is no yellowing, and 1 is distinct yellowing. Value: 4–5.
NOX test: 5

Example D2

Carpet material of the same kind and colouring as in D1 was impregnated with a liquor containing 24 g/l of the product as per Example C3. The pH of the liquor was adjusted with citric acid to 5. Then the carpet was squeezed off to a wet pick-up of 100%. Fixation was carried out without intermediate drying at 140° C. for 10 min.
Evaluation:
Staining value: 4–5 on grey scale
Staining value after an aqueous-alkaline extraction: 3–4
Hue change due to finish was determined colorimetrically and calculated by CIELAB as ΔE: 1.3
The yellowing following the Fade-O-Meter exposure of AATCC-16 for 24 h was evaluated on the grey scale to assess the change in hue. Values 1–5, where 5 is no yellowing, and 1 is distinct yellowing. Value: 4.

Example D3

20×30 cm portions of a tufted carpet consisting of a PP base fabric, PA 6,6 pile with a pile weight of 600 g, dyed with acid dyes in a pale beige hue and provided with a latex backing, were sprayed with 12 ml of a liquor containing 150 g/l of the product as per Example C2 and whose pH had been adjusted with citric acid to 5. The carpet pieces were dried at room temperature. Their evaluation was carried out 24 h after application.
Evaluation:
Staining value: 4–5
Hue change due to finish was determined colorimetrically and calculated by CIELAB as ΔE: Value 0.3
The yellowing following the Fade-O-Meter exposure of AATCC-16 for 24 h was evaluated on the grey scale to assess the change in hue. Values 1–5, where 5 is no yellowing, and 1 is distinct yellowing. Value: 5

Example D4

20×30 can portions of a tufted carpet consisting of a PP base fabric, PA 6,6 pile with a pile weight of 600 g, dyed with acid dyes in a pale beige hue and provided with a latex backing, were sprayed with 12 ml of a liquor containing 150 g/l of the product as per Example C4 and whose pH had been adjusted with citric acid to 5. The carpet pieces were dried at room temperature. Their evaluation was carried out 24 h after application.
Evaluation:
Staining value: 5

Example D5

Carpet material of the same kind and colouring as in D1 was impregnated with a liquor containing 24 g/l of the product as per Example C4. The pH of the liquor was adjusted with amidosulphonic acid to 3. Then the carpet was squeezed off to a wet pick-up of 100%. Fixation was carried out without intermediate drying at 140° C. for 10 min.
Evaluation:
Staining value: 5 on grey scale
Staining value after an aqueous-alkaline extraction: 4
Hue change due to finish was determined colorimetrically and calculated by CIELAB as ΔE: Value 1.1
The yellowing following the Fade-O-Meter exposure of AATCC-16 for 24 h was evaluated on the grey scale to assess the change in hue. Values 1–5, where 5 is no yellowing, and 1 is distinct yellowing. Value: 5

Example D6

Carpet material consisting of PP base fabric with a tufted pile of PA 6,6 fibres and a pile weight of 600 g or carpet yarn made of PA 6,6 was dyed with a combination of
0.015% of TELON Lightfast Yellow K-RLN 200%
0.0035% of TELON Lightfast Red FRL 200%
0.0033% of TELON Lightfast Blue K-GGL 200%,
at pH 6 at 95° C. for 30 min, then rinsed hot and treated in a fresh bath at 70° C. for 20 min with 2.4% of the product described in Example C4. The pH was adjusted with citric acid to 3. This was followed by rinsing and drying.
Evaluation:
Staining value: 5 on grey scale
Staining value following an aqueous-alkaline extraction: 3–4

Similar results were obtained on replacing the stated product by 0.8% of the product as per Example A7 or 1.6% of the product as per Example B1.

Example D7

Carpet material of the same kind and colouration as in D1 was impregnated with a liquor containing 4.3 g/l of the product as per Example A4 and 16.5 g/l of the product as per Example B4. The pH of the liquor was adjusted with citric acid to 5. Then the carpet was squeezed off to a wet pick-up of 100%. Fixation was carried out without intermediate drying at 140° C. for 10 min.
Evaluation:
Staining value: 5 on grey scale
Staining value after an aqueous-alkaline extraction: 3–4
Hue change due to finish was determined colorimetrically and calculated by CIELAB as ΔE: Value 1.6
The yellowing following the Fade-O-Meter exposure of AATCC-16 for 24 h was evaluated on the grey scale to assess the change in hue. Value: 4.

Similar results were obtained on replacing the stated products by 5.5 g/l of the product as per Example A8 and 16 g/l of the product as per Example B5 or 24 g/l of the product as per Example C5.

What is claimed is:

1. A process for the anti-stain finishing of polyamide-containing fibre materials, which comprises applying to said materials a ready-prepared mixture of a sulpho-containing aromatic formaldehyde condensation product along with the application of a polyacrylic acid, the application of the formaldehyde condensation product and the application of the polyacrylic acid being carried out in any desired order or simultaneously.

2. The process of claim 1, wherein the formaldehyde condensation products contain as cocondensed units at least one compound selected from the group consisting of benzene or naphthalene monosubstituted to trisubstituted by radicals independently selected from the group consisting of hydroxyl, $C_1$–$C_4$-alkyl, cyclopentyl, cyclohexyl, $C_1$–$C_4$-alkoxy, $C_1$–$C_4$-hydroxyalkoxy, phenyl, phenoxy, benzyl, benzyloxy, carboxyl, $C_1$–$C_4$-alkoxycarbonyl, phenylcarbonyl and phenylsulphonyl, 10–100% of all benzene or naphthalene compounds in the condensates carrying sulphonic acid groups.

3. The process of claim 2, wherein the condensation products are prepared from dihydroxydiphenyl sulphone with formaldehyde and phenolsulphonic acid, naphthalenesulphonic acid, naphtholsulphonic acids or alkali or alkaline earth metal sulphites or from sulphonyldihydroxydiphenyl-monosulphonic or -disulphonic acid with formaldehyde.

4. The process of claim 3, wherein 35–65% of all monosubstituted to trisubstituted benzene and naphthalene compounds carry sulphonic acid groups and 65–35% of all derivatives carrying sulphone groups.

5. The process of claim 3, wherein the formaldehyde condensation products have a molar ratio of aromatic compounds to formaldehyde=1–2:1.

6. The process of claim 5, wherein the aromatic compounds are (a) phenolsulphonic acid, and (b) dihydroxydiphenyl sulphone which have a molar ratio of (a) phenolsulphonic acid, (b) dihydroxydiphenyl sulphone and (c) $CH_2O$ which is a:b:c=1:0.7–2.5:0.85–3.5.

7. The process of claim 1, wherein the polyacrylic acid contains at least 70 mol % of copolymerized acrylic acid, the remainder being comonomers selected from the group consisting of maleic acid, vinyl acetate, acrylamide, $C_1$–$C_4$-alkyl acrylates, styrene and $C_2$–$C_6$-olefins, and the polyacrylic acid having molecular weights within the range of 1000–500,000.

8. The process of claim 7, wherein the polyacrylic acid contains at least 90 mol % of copolymerized acrylic acid.

9. The process of claim 1, wherein condensates and polyacrylic acid are present in a weight ratio of 1:1–20.

10. The process of claim 9, wherein condensates and polyacrylic acid are present in a weight ratio of 1:1–10.

11. The process of claim 10, wherein condensates and polyacrylic acid are present in a weight ratio of 1:2–6.

12. A composition for carrying out the process of claim 1 consisting of a ready-prepared mixture of the sulpho-containing aromatic formaldehyde condensation product and the polyacrylic acid.

13. The composition of claim 12, consisting of

1–15% by weight of the condensation product,

2–45% by weight of polyacrylic acid,

0–2% by weight of a complexing agent (water as remainder).

14. The composition of claim 13, consisting of

2–10% by weight of a condensation product of dihydroxydiphenyl sulphone with formaldehyde and phenolsulphonic acid, naphthalenesulphonic acid or alkali metal sulphites which is soluble in a pH range of 2–5, 8–40% by weight of an acrylic acid polymer having an acrylic acid content of at least 90 mol %, 0–1.5% by weight of a complexing agent selected from the group consisting of nitrilotriacetic acid, ethylenediamine-tetraacetic acid, hydroxyethane-diphosphonic acid and aminomethylene-phosphonic acids, and 0–1.5% by weight of a reducing agent selected from the group consisting of alkali metal or ammonium hydroxymethanesulphoninates or dithionites or thiourea dioxide.

15. Polyamide-containing fibre materials having a polyamide content of 50–100% by weight of the total fibre material, finished by the process of claim 1.

16. The polyamide-containing fiber materials of claim 15 for the manufacture of carpet material.

17. Carpet material manufactured of the polyamide-containing fiber material of claim 15.

* * * * *